Jan. 17, 1956  R. STEVENSON  2,731,035
SPRING LOADED DUAL TYPE RELIEF VALVE
Filed Aug. 30, 1951
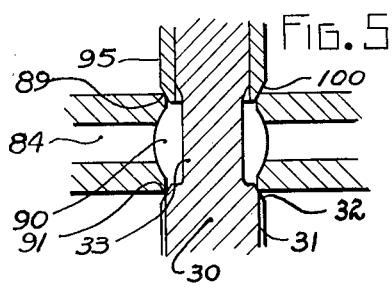
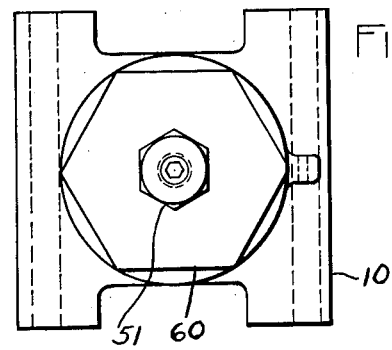
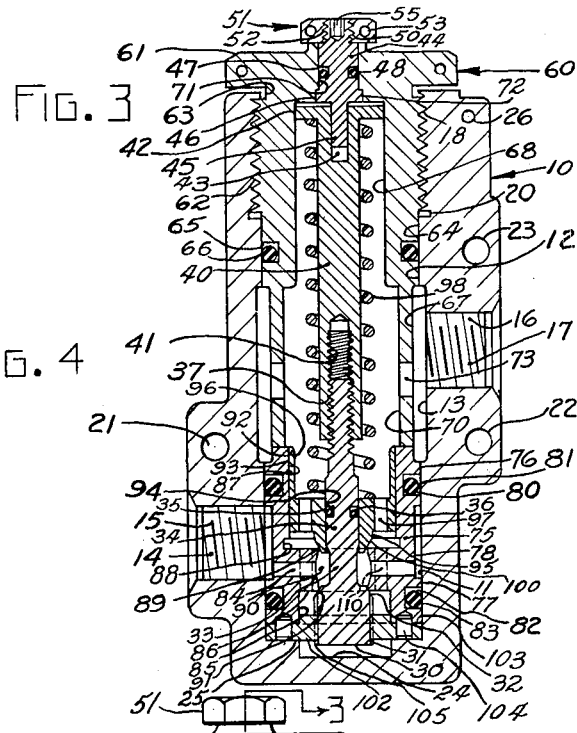
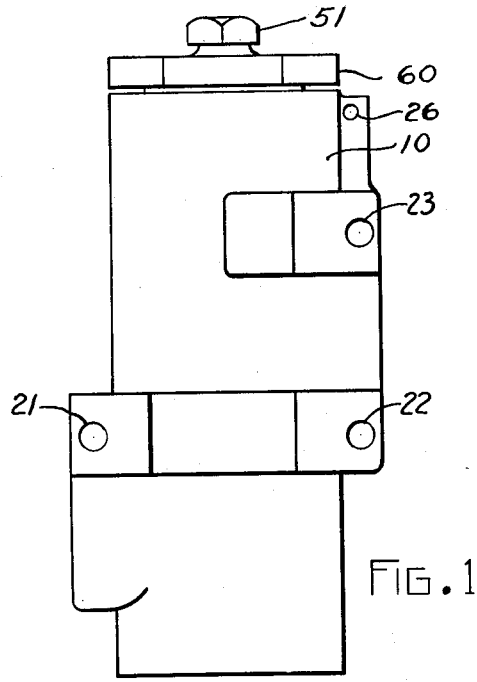
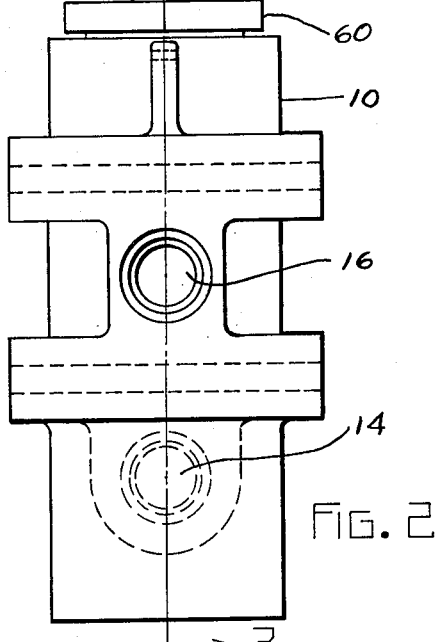
INVENTOR.
ROBERT STEVENSON
BY
William Frederick Werner
ATTORNEY

United States Patent Office 2,731,035
Patented Jan. 17, 1956

2,731,035

SPRING LOADED DUAL TYPE RELIEF VALVE

Robert Stevenson, Barrington, R. I., assignor to Anco, Inc., a corporation of Rhode Island Application August 30, 1951, Serial No. 244,312

3 Claims. (Cl. 137—512.1)

This invention relates to a hydraulic pressure relief valve such as may be used to control the storing of fluid at a certain predetermined pressure in a reservoir or the like for operating some work unit.

One of the objects of the present invention is to provide a pressure relief valve in a hydraulic pressure system which remains inoperative until the pressure reaches a predetermined amount, beyond that amount the relief valve allows the fluid to escape back to the reservoir in proportion to the amount of excess pressure in the system.

Another object of this invention is to provide a dual valve so arranged that a single light spring may be utilized for controlling the valve and hence be extremely sensitive to the change in pressure.

Another object of this invention is to provide a simply controlled valve, inexpensive to manufacture, having few parts, yet one which will operate satisfactorily under varying high pressures and remain sensitive and quick acting to pressure changes.

Still another object of the present invention is to provide a spring loaded dual type relief valve for use in high pressure hydraulic systems with a construction which avoids chattering and screeching.

With these and other objects in view, the invention consists of certain novel features of construction which will be more fully described and particularly pointed out in the appended claims.

In the past when the pressure in the system approached the setting of the valve, the valve would lift off its seat, momentarily relieve and snap shut causing vibration which is known as chattering. This was due to a lack of sensitivity at the cracking or relieving pressure point. In addition, the flow of hydraulic fluid through the pressure relief valve, followed a tortuous path which was also restrictive causing turbulence which resulted in screeching. The present invention obviates these conditions.

The present invention is particularly adaptable to aircraft because the fewer parts result in a relief valve of less weight than formerly was possible. The sensitivity results in safer pressure systems due to fewer breaks in pressure lines.

Like reference numerals refer to like parts in the accompanying drawings in which:

Figure 1 is a front elevational view of the new hydraulic pressure relief valve.

Figure 2 is a side elevational view of the same.

Figure 3 is a longitudinal sectional view taken along line 3—3 of Figure 2 looking in the direction of the arrows.

Figure 4 is a top view of the valve.

Figure 5 is a fragmentary sectional view showing the construction of the valve plugs and valve seats.

With reference to the drawing, 10 designates the housing having a cylindrical bore 11 in its lower end with a cylindrical sealing seat 12 separated therefrom by a cylindrical recess 13. A line port 14 provided with threads 15 is located in the lower section of housing 10 connecting cylindrical bore 11 with the outside of said housing 10. A reservoir port 16 located in the central area of housing 10, having threads 17, connects cylindrical recess 13 with the outside of said housing 10. The upper internal diameter of housing 10 is provided with threads 18 which are relieved from sealing seat 12 by a cylindrical recess 20. Bolt holes 21, 22, and 23 in housing 10 are used to allow fastening means to secure said housing 10 to a hydraulic system apparatus such as a pump, tank or the like. A relief bore 24 located in the internal base of housing 10 provides a ledge 25 in the bottom of cylindrical bore 11. A wire retaining hole 26 is located in the upper end of housing 10 for reasons presently to be described.

A valve plug 30 provided with four female key slots 31 in its head portion, is provided with a beveled surface 32 adapted to cooperate with a valve seat. At the juncture of the beveled surface the valve stem 33 integrally connects with the valve plug 30. Valve stem 33 increases in diameter to form valve stem seat 34 having a cylindrical recess 35 adapted to house a neoprene O sealing ring 36. Beyond the valve stem seat 34, the valve stem 33 is reduced in diameter and provided with a screw thread 37.

A valve stem extension 40 is provided with internal screw threads 41 adapted to cooperate with screw thread 37 on valve stem 33. The end opposite the screw threads 41 has a flange 42 and is provided with a hexagonal hole 43. A valve stem extension key 44 having a hexagonal end 45 adapted to fit in hexagonal hole 43 is provided with a collar 46 adapted to seat in a counterbore 72. A cylindrical recess 47 in the body of valve stem extension key 44 is adapted to house a neoprene O sealing ring 48. An external screw thread 50 is adapted to cooperate with a lock nut 51 which seats on the boss on the upper face of the gland 60 and having corresponding threads 52 and wire receiving holes 53. The upper end of valve stem extension key 44 is provided with a wrench receiving aperture 55 shown as comprising means for receiving an Allen wrench.

A gland 60 having an enlarged head portion 61 is provided with a thread 62 on its external diameter adapted to cooperate with threads 18 in housing 10. A circular recess 63 separates thread 62 from head portion 61. The main body below thread 62 is formed into a flange 64 adapted to cooperate with cylindrical seal seat 12. A circular recess 65 is adapted to house a neoprene O sealing ring 66 which forms a fluid seal at that point.

The main body below flange 64 consists of wall 67. Internally, gland 60 consists of a circular passageway 68. Wall 67 is reduced in thickness as shown at 70. Gland 60 is provided with a restricted passageway 71 having a counterbored area 72 adapted to accommodate collar 46. Four openings 73 are provided in wall 67, for reasons presently to become apparent.

A valve seat body 75 generally circular in all of its dimensions in one embodiment is provided with upper and lower external flanges 76 and 77 separated from each other by a circular set back 78. Flange 76 is provided with a circular recess 80 adapted to accommodate a neoprene O sealing ring 81 which provides a fluid tight seal in conjunction with cylindrical bore 11. Similarly flange 77 is provided with a circular recess 82 adapted to accommodate a neoprene O sealing ring 83 which also provides a fluid tight seal in conjunction with cylindrical bore 11. Passageways consisting of four orifices 84, pass transversely through valve seat body 75 providing communication from circular set back 78 to vertical passageway 90. The base of valve seat body 75 is counterbored creating wall 85 and bottom 86. The upper inside diameter is hollowed out to create a bearing surface 87 which is relieved at its lower end forming a recess 88. A vertical passageway 90 relieved in its central area forms two valve seats 89 and 91. Four holes 110 provide passageways through the wall between bottom 86 and the base of recess 88.

An auxiliary valve plug 92 has an external bearing surface 93 which cooperates with bearing surface 87 to provide a smooth sliding fit between the surfaces. A central passageway 94 allows valve stem seat 34 to freely slide therein. Neoprene O sealing ring 36 forms a fluid tight seal between the surfaces. A projection 95 extending from the main portion of auxiliary valve plug 92 is beveled at 100 to form a fluid tight contact with valve seat 89. A central bore 96 is provided in the upper internal portion of said plug 92. Four vertical passageways 97 are provided in the main body of said plug 92.

A spring 98 surrounding valve stem extension 40 extends from the base of central bore 96 to the underside flange 42 urging auxiliary valve plug 92 away from valve stem extension 40.

A plate 102 secured to base 103 of valve seat body 75 by means of dowels 104 is provided with four male flanges 105 adapted to engage female key slots 31 thereby preventing valve plug 30 from turning; with the consequent disruption of the screw thread adjustment between threads 37, 41.

In operation the various parts function as follows: Threads 15 will unite line port 14 with a connection in a hydraulic system. The fluid under pressure will pass around cylindrical bore 11 and into passageways 84 then to vertical passageway 90 where it will be contained by beveled surface 32 held against valve seat 91 against the tension of spring 98 and bevel 100 held against valve seat 89 by means of the same spring 98. When the fluid pressure exceeds the tension spring 98 exerts on beveled surfaces 32 and 100 said beveled surfaces will separate from their respective valve seats 91, 89 allowing the fluid to flow into recess 88 and the recess formed by wall 85, bottom 86, and plate 102. The fluid will flow through holes 110 into recess 88 and then through passageways 97, central bore 96, openings 73, cylindrical recess 13, reservoir port 16 on to the connection of the hydraulic system reservoir united to threads 17. As the pressure in the fluid diminishes, the tension of spring 98 will exert itself to unite beveled surfaces 32, 100 with valve seats 89, 91 thereby preventing the fluid from circulating into the pressure relief valve. Conversely the fluid will be contained in vertical passageway 90.

Gland 60 through the medium of threads 62 engaging threads 18 in housing 10 holds valve seat body 75 against plate 102 which rests on ledge 25 of housing 10.

The arrangement of screw threads 37 on valve plug 30 allows for adjustment of beveled surface 32 to valve seat 91 by means of threads 41 in valve stem extension 40, cooperating with said threads 37. Valve extension 40 provided with hexagonal hole 43 cooperates with hexagonal end 45 to the extent that when valve stem extension key 44 is turned by means for example of an Allen head wrench, valve stem extension 40 will adjust the relationship of internal screw threads 41 with screw threads 37. Lock nut 51 holds valve stem extension key 44 in position.

It will be seen therefore, that spring 98 balances valve plug 30 with auxiliary valve plug 92. The various neoprene O rings prevent the fluid from escaping the desired path of travel from line port 14 to reservoir port 16.

Having shown and described a preferred embodiment of the present invention, by way of example, but realizing that structural changes could be made and other examples given without departing from either the spirit or scope of this invention,

What I claim is:

1. In combination, a member having a passageway, a recess about said member, passageways connecting said first passageway with said recess, oppositely disposed valve seats in said passageway and orifice connections between the surfaces forming the external surfaces of said valve seats, circular recesses about said member having a passageway, O rings in said circular recesses, an auxiliary valve plug having passageways and being slidably mounted in said member having a passageway and engaging one of said valve seats, a second valve plug having a beveled surface engaging the other valve seat, key slots in said second valve plug engageable with flanges on a plate secured to said member having a passageway, said second valve plug having a valve stem slidably mounted in said auxiliary valve plug, said valve stem containing a recess housing an O ring engageable with said auxiliary valve plug, a thread on said valve stem engageable with threads in a valve stem extension having an enlarged end with a hexagonal depression, a spring mounted on said valve stem extension extending from said enlarged end to said auxiliary valve plug, a housing having a line port communicating with said recess in said member having a passageway, a ledge in said housing engaging said plate having flanges, a relief bore in said housing beneath said second valve plug, a cylindrical bore in said housing engageable with said O rings in said member having a passageway, a reservoir port in said housing, a flange and threads in said cylindrical bore and a recess between said flange and threads in said cylindrical bore, a gland having threads engageable with said threads in said cylindrical bore, a recess in said gland housing an O ring engageable with said flange in said cylindrical bore, a wall formed below said flange and provided with an opening, the end of said wall engaging said member having a passageway, a restricted passageway in said gland having a counterbored area on one end and a boss on the other end, a valve stem extension key having a collar engaging said counterbored area, a recess in said valve stem extension key housing an O ring engaging said restricted passageway in said gland, a hexagonal end on said key engaging said hexagonal depression in said valve stem, a wrench receiving depression in said key, threads on said key engageable with a lock nut contacting said boss on said gland.

2. A spring loaded dual type relief valve consisting of a housing having a line port, a reservoir port and a cylindrical bore communicating with said ports, a valve seat body provided with a vertical passageway forming a set of valve seats, secured in said cylindrical bore between said ports in fluid tight relationship, a circular set back in said valve seat body, orifices in said seat body connecting said vertical passageway with said circular set back, apertures in said valve seat body set transversely to said orifices, an auxiliary valve plug slidably mounted in said valve seat body and having a beveled surface engageable with one of said set of valve seats, a plurality of vertical ports provided in said auxiliary valve plug, a second valve plug having a beveled surface engageable with the second of said set of valve seats, a valve stem extension adjustably secured to said second valve plug, a spring mounted on said valve stem extension and extending to said auxiliary valve plug, a gland adjustably secured in said housing abutting said valve stem extension.

3. A spring loaded dual type relief valve consisting of a housing having a cylindrical bore therethrough, a cylindrical sealing seat intermediate its length, a cylindrical recess between the cylindrical bore and the cylindrical sealing seat, a screw thread in the upper end of said housing, a line port in said housing in communication with the cylindrical bore and a reservoir port in communication with the cylindrical recess, a valve seat body provided with upper and lower external flanges engageable with said cylindrical bore in fluid tight relationship, a circular set back located between said upper and lower external flanges, a vertical passageway relieved on opposite ends to form oppositely disposed valve seats, a plurality of orifices passing transversely through the valve seat body, connecting said vertical passageway with said circular set back, a second set of a plurality of orifices passing vertically through said valve seat body, connecting the relieved areas on opposite ends of said vertical passageway, an auxiliary valve plug having an external bearing slidably engageable with one of the relieved areas on opposite ends of said vertical passageway, a central passageway through said auxiliary valve plug, a projection extending from the main portion of said auxiliary plug, beveled to form a fluid tight contact with one of said valve seats formed in said vertical passageway, a number of vertical passageways provided through said auxiliary valve plug parallel to said central passageway, a gland provided with screw threads engageable with the screw threads in the upper end of said cylindrical bore, an external flange below said screw threads engageable with said cylindrical sealing seat in fluid tight relationship, a reduced diameter portion below said external flange provided with a number of ports communicating with said cylindrical recess, the lower end of said reduced diameter portion abutting the top of said valve seat body, a valve plug provided with a number of key slots in one end, a beveled surface formed in that end engageable with the other of said valve seats formed in said vertical passageway to form a fluid tight seal, a shank formed in said valve plug slidably engageable with said central passageway in said auxiliary valve plug in fluid tight relationship, a threaded end on said stem, a valve stem extension having threads engageable with the threads on said shank, an enlarged area formed on one end of said extension and having an hexagonal orifice, a spring interposed between said enlarged area and said auxiliary valve plug, a bearing in said gland, a valve stem extension key rotatively mounted in said bearing in fluid tight relationship, a hexagonal end on said key engageable in said hexagonal orifice in said valve stem extension and a plate secured to said valve seat body provided with a number of male flanges engageable with the key slots in said valve plug.

References Cited in the file of this patent

UNITED STATES PATENTS

| | | |
|---|---|---|
| 109,483 | Ancona | Nov. 22, 1870 |
| 165,119 | Prosser | June 29, 1875 |
| 281,369 | Jarecki | July 17, 1883 |
| 310,459 | Nicholson | Jan. 6, 1885 |

FOREIGN PATENTS

| | | |
|---|---|---|
| 85,651 | Germany | 1896 |